US012598194B2

(12) United States Patent
Wang et al.

(10) Patent No.: US 12,598,194 B2
(45) Date of Patent: Apr. 7, 2026

(54) FINE GRANULARITY CONTROL OF DATA ACCESS AND USAGE ACROSS MULTI-TENANT SYSTEMS

(71) Applicant: Salesforce, Inc., San Francisco, CA (US)

(72) Inventors: Chi Wang, San Francisco, CA (US); Eugene Wayne Becker, San Francisco, CA (US); Nidhi Chaudhary, San Francisco, CA (US); Kishore Chaganti, San Francisco, CA (US); Prasad Nimmakayala, San Francisco, CA (US); Qingbo Cai, San Francisco, CA (US); Linwei Zhu, San Francisco, CA (US); Hsiang-Yun Lee, San Francisco, CA (US); Amit Zohar, San Francisco, CA (US); Raghu Setty, San Francisco, CA (US); Bhavesh Doshi, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 155 days.

(21) Appl. No.: 18/429,331

(22) Filed: Jan. 31, 2024

(65) Prior Publication Data

US 2025/0106221 A1 Mar. 27, 2025

Related U.S. Application Data

(60) Provisional application No. 63/584,833, filed on Sep. 22, 2023.

(51) Int. Cl.
*G06F 21/62* (2013.01)
*H04L 9/40* (2022.01)

(52) U.S. Cl.
CPC ........ *H04L 63/108* (2013.01); *G06F 21/6218* (2013.01); *H04L 63/083* (2013.01); *H04L 63/102* (2013.01); *H04L 63/105* (2013.01)

(58) Field of Classification Search
CPC ... H04L 63/108; H04L 63/083; H04L 63/102; H04L 63/105; H04L 63/0807; G06F 21/6218; G06F 21/6245
See application file for complete search history.

(56) References Cited

U.S. PATENT DOCUMENTS

| | | | |
|---|---|---|---|
| 10,757,015 B2 | 8/2020 | Wang et al. | |
| 11,163,722 B2 | 11/2021 | Wang et al. | |

(Continued)

OTHER PUBLICATIONS

U.S. Appl. No. 18/429,275, USPTO e-Office Action: CTNF—Non-Final Rejection, Sep. 10, 2025,15 pages.

(Continued)

*Primary Examiner* — Amie C. Lin
(74) *Attorney, Agent, or Firm* — Kwan & Olynick LLP

(57) ABSTRACT

System and method for fine granularity control of data access and usage for across multi-tenant systems. A user makes a request to access a particular set of data from a particular remote data source for a specific purpose. The system authorizes the user to validate whether the user is qualified to make the request. The data source is checked to see if the particular data has been granted access for that particular purpose. A cloud neutral token is created and converted into a cloud specific token upon reaching the remote data source. The cloud specific token is used to create a temporary IAM role and IAM policy with a predetermined time to live. After the time to live expires, the IAM role and IAM policy are deleted.

20 Claims, 10 Drawing Sheets

(56) References Cited

U.S. PATENT DOCUMENTS

| | | | |
|---|---|---|---|
| 11,194,961 B2 | 12/2021 | Wang et al. | |
| 11,582,091 B2 | 2/2023 | Wang et al. | |
| 2018/0077143 A1 | 3/2018 | Sridharan et al. | |
| 2019/0286832 A1* | 9/2019 | Szeto | H04W 12/082 |
| 2020/0084098 A1 | 3/2020 | Wang et al. | |
| 2022/0038449 A1* | 2/2022 | Tripp | H04L 67/02 |
| 2022/0043797 A1 | 2/2022 | Wang et al. | |
| 2022/0046110 A1 | 2/2022 | Wang et al. | |
| 2023/0239301 A1 | 7/2023 | Ivanov et al. | |
| 2023/0244505 A1 | 8/2023 | Hernandez Serrano et al. | |
| 2023/0362172 A1* | 11/2023 | Mandagere | G06F 21/6272 |
| 2024/0283784 A1* | 8/2024 | McCormick | H04L 63/20 |
| 2025/0106200 A1 | 3/2025 | Wang et al. | |

OTHER PUBLICATIONS

U.S. Appl. No. 18/429,356, USPTO e-Office Action: CTFR—Final Rejection, Nov. 5, 2025, 9 pages.
U.S. Appl. No. 18/429,356, USPTO e-Office Action: CTNF—Non-Final Rejection, Sep. 10, 2025, 16 pages.

* cited by examiner

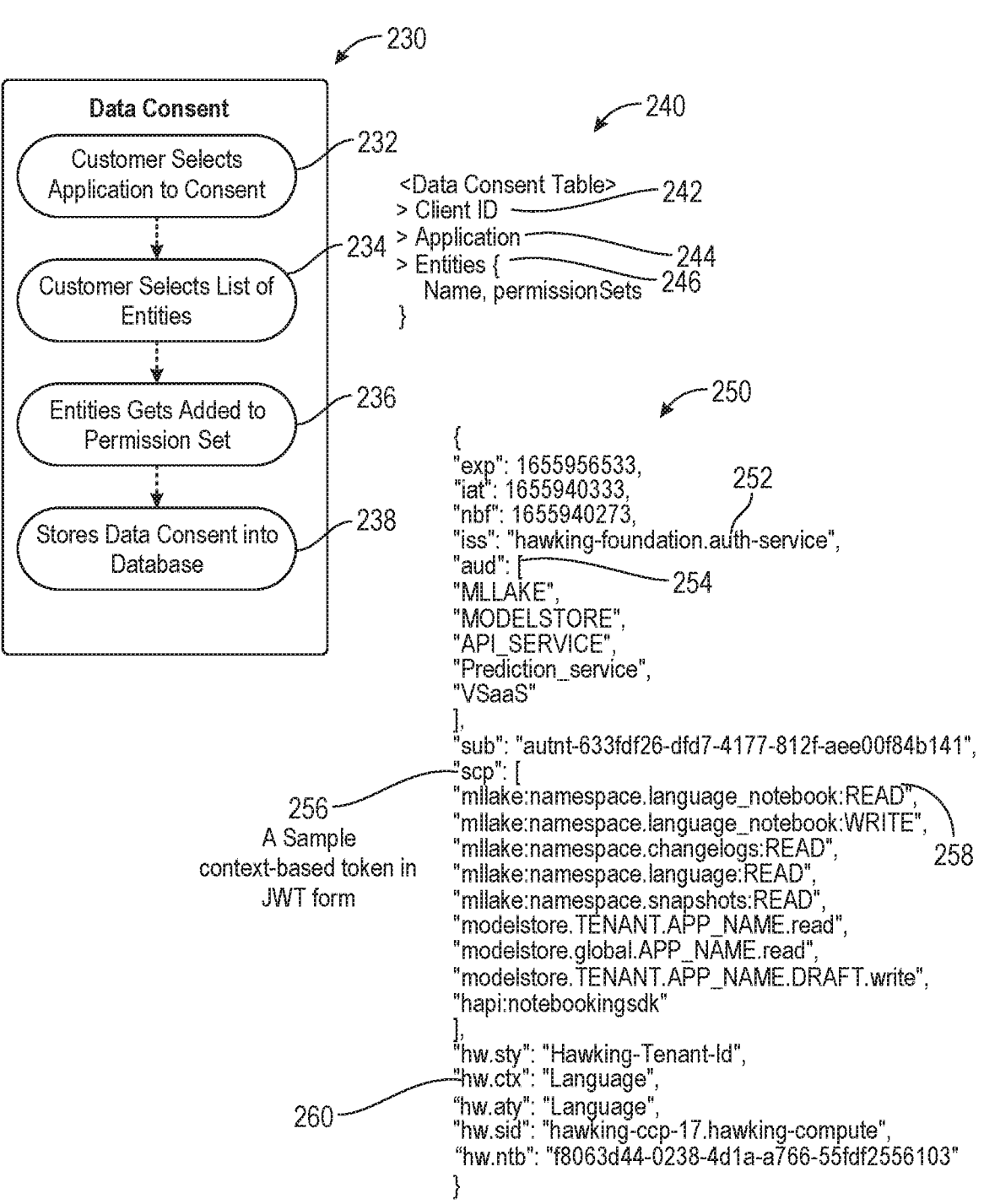

230

Data Consent

Customer Selects Application to Consent — 232

Customer Selects List of Entities — 234

Entities Gets Added to Permission Set — 236

Stores Data Consent into Database — 238

240

```
<Data Consent Table> —242
> Client ID
> Application —244
> Entities { —246
    Name, permissionSets
}
```

250

```
{
"exp": 1655956533,
"iat": 1655940333,               252
"nbf": 1655940273,
"iss": "hawking-foundation.auth-service",
"aud": [                —254
"MLLAKE",
"MODELSTORE",
"API_SERVICE",
"Prediction_service",
"VSaaS"
],
"sub": "autnt-633fdf26-dfd7-4177-812f-aee00f84b141",
"scp": [
"mllake:namespace.language_notebook:READ",
"mllake:namespace.language_notebook:WRITE",
"mllake:namespace.changelogs:READ",          258
"mllake:namespace.language:READ",
"mllake:namespace.snapshots:READ",
"modelstore.TENANT.APP_NAME.read",
"modelstore.global.APP_NAME.read",
"modelstore.TENANT.APP_NAME.DRAFT.write",
"hapi:notebookingsdk"
],
"hw.sty": "Hawking-Tenant-Id",
"hw.ctx": "Language",
"hw.aty": "Language",
"hw.sid": "hawking-ccp-17.hawking-compute",
"hw.ntb": "f8063d44-0238-4d1a-a766-55fdf2556103"
}
```

256 —
A Sample context-based token in JWT form

```
{
    "Version": "2012-10-17",
    "Statement": [
        {
            "Sid": "NotebookEnvPolicy01",
            "Principal": { "AWS": "arn:aws:iam::AWS-account-ID:role/notebook_23f615c7-
0bff-44eb-8654-b70746447787_jennie" },
            "Effect": "Allow",
            "Action": "s3:GetObject",
            "Resource": "arn:aws:s3:::notebooking/project-23f615c7-0bff-44eb-8654-
b70746447787/env-92d25147-02c5-41e4-84b1-874e448ab41b/*"
            "Condition": {
                "StringEquals": {
                    "aws:ResourceTag/app": "${aws:PrincipalTag/app}"
                    "aws:ResourceTag/user": "${aws:PrincipalTag/user}"
                }
            }
        }
    ]
}
```

FIG. 2D

FINE GRANULARITY CONTROL OF DATA ACCESS AND USAGE ACROSS MULTI-TENANT SYSTEMS

CROSS-REFERENCE TO RELATED APPLICATIONS

This application claims priority to Provisional U.S. Patent Application No. 63/584,833, titled "FINE GRANULARITY CONTROL OF DATA ACCESS AND USAGE ACROSS MULTI-TENANT SYSTEMS," filed on Sep. 22, 2023, by Chi Wang et al., which is incorporated herein by reference in its entirety and for all purposes.

FIELD OF TECHNOLOGY

This patent document relates generally to computer systems, and more specifically to database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

In the context of enterprise software, machine learning can boost business value due to its ability to create automation of intelligent solutions through AI algorithms. The success of the AI based solutions depends on many factors. One of the key factors is data. However, obtaining access to data has many challenges. In traditional systems, users are granted access through role-based access control (RBAC). However, RBAC has many deficiencies. For example, once a user is granted access to data via RBAC, the user can then use the data any purpose, including purposes not intended by the owner of the data.

While traditional RBAC is used to control data access in today's technology, it does not allow for usage purpose control of data for a number of reasons. First, access to data is the only concern for RBAC. Consequently, once the user has access to the data, the use of the data cannot be enforced. This means that the owner of the data cannot institute fine granularity control of access to their data. Second, even if systems could enforce the purpose, the purpose is constantly changing. This will require constant changing of roles themselves, which is a tedious manual process, effectively preventing the ability to scale. Third, in multi-tenant systems, each tenant system may use different cloud platforms. This complicates access control because the access will need to work on multiple different platforms. Thus, there is a need for a system that includes fine granularity control of data access and usage that can conform to a dynamic data environment in a platform agnostic format.

BRIEF DESCRIPTION OF THE DRAWINGS

The included drawings are for illustrative purposes and serve only to provide examples of possible structures and operations for the disclosed inventive systems, apparatus, methods and computer program products for managing decentralized high risk actions across different coordinated systems. These drawings in no way limit any changes in form and detail that may be made by one skilled in the art without departing from the spirit and scope of the disclosed implementations.

FIG. 2C illustrates an example data consent workflow, in accordance with embodiments.

FIG. 2D illustrates an example cloud specific token, in accordance with one or more embodiments.

DETAILED DESCRIPTION

Figure 1:
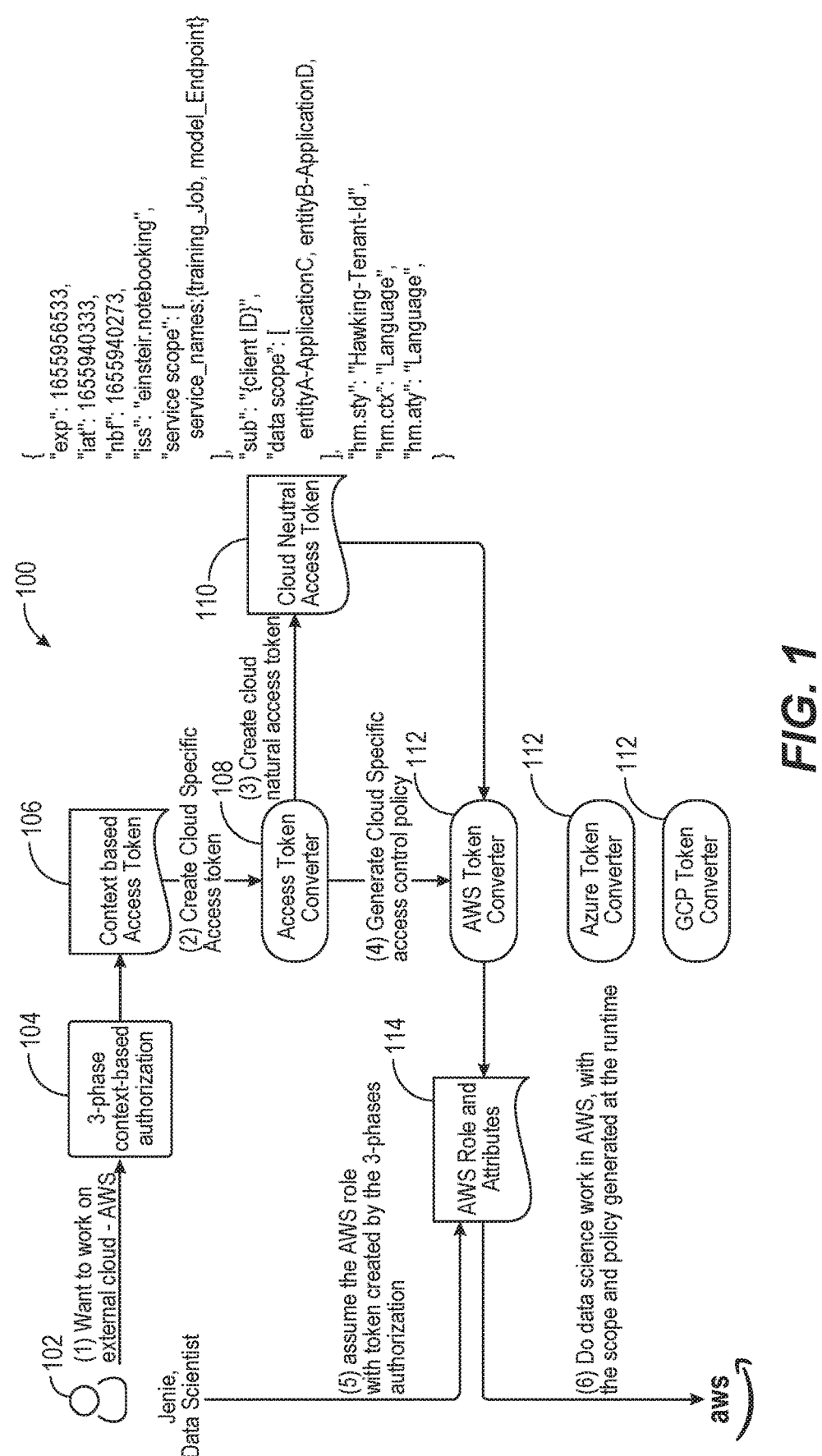
FIG. 1 is a flow diagram of a process for fine granularity data access control, in accordance with one or more embodiments.

In the following description, numerous specific details are set forth in order to provide a thorough understanding of the present disclosure. The present disclosure may be practiced without some or all of these specific details. In other instances, well known process operations have not been described in detail to not unnecessarily obscure the present disclosure. While the disclosure will be described in conjunction with the specific embodiments, it will be understood that it is not intended to limit the disclosure to the embodiments.

As mentioned above, machine learning is fueled by data, but access to data cannot be granted without authorization. Especially for SaaS companies with multi-tenant systems, a sophisticated permission control system is needed to ensure end-customers have control over who can access their data (and the artifacts derived from it) and in what circumstances.

However, building such a permission control system can be challenging for many reasons. One reason is that current user permission management solutions are static and disjointed. Another reason is that current access permission protocols are not fine tuned enough to control the purpose of data access. Yet another reason is that for multi-tenant systems, each tenant system may have their own user and permission system which may not be compatible with other tenant systems.

In addition, controlling data access for data science is further complicated by the fact that machine learning development often involves tools and services from public clouds, such as AWS, GCP, and Azure. Every ML public service and system has its own authentication and user management system. Consequently, applying one security standard to all third-party systems can be challenging and is often done in a disjointed manner. Often, systems have to create accounts, roles, and permissions for the same data scientist in different third-party systems. As this static and offline method involves lots of manual configuration and validation, it is inefficient and problematic.

Thus, the techniques and mechanisms of the present disclosure provide for an automated method to retrieve data permissions using short-lived fine granularity controlled data access roles that work across multiple different types of platforms.

OVERVIEW

According to various embodiments, techniques and mechanisms of the present disclosure implement a real-time context-based (3 phases) user authorization mechanism to regulate data access in a multi-tenant environment. By using this three-phase authorization process, the system can carefully control what data a data scientist could access, per client, per application, per data type, and per data table. Furthermore, this mechanism is flexible and time-saving because it automates what would traditionally be manual labor.

In addition, the techniques and mechanisms of the present disclosure integrate the context-based authorization process with third-party cloud systems, such as AWS SageMaker, Microsoft Azure, and Salesforce Machine Learning Platform. By adding cloud-neutral access tokens and intermediate converters to automate the creation and authorization of permission sets across all third-party systems, the techniques and mechanisms make the permission management process seamless for data scientists as they move between different systems in real time. Further, by adding cloud-neutral access tokens and intermediate converters, the solutions presented herein automate the creation and authorization of permission sets across all third-party systems in a platform agnostic manner, thereby making the permission management process seamless for data scientists as they move between different systems in real time.

DETAILED EXAMPLES

FIG. 1 is a flow diagram of a process for fine granularity data access control, in accordance with one or more embodiments. Process flow 100 first begins when a user 102, e.g., a Data Scientist (Jenie), wants to work on an external cloud, e.g., AWS, and so makes a request to gain access to certain data for a particular purpose. In order to do so, user 102 must be authorized for access. In some embodiments, the authorization process involves a 3-phase context-based authorization process 104, described in further detail with respect to FIG. 2A. After user 102 (the data scientist) passes the 3-phase authorization 104, she will have a context-based access token 106, which in some embodiments is assigned by a notebook (NB) system. In some embodiments, the context-based access token includes information on what data source is being requested, what set of data is being requested, and for what purpose the data is to be used.

Next, an access token converter 108 will convert context-based token 106 to a cloud neutral token 110, which is cloud agnostic, but defines data & operation scope in a general structure. This cloud neutral token 110 is then converted into a cloud specific token for use in a remote cloud system. This remote system is the destination for user 102 to access the data. In this example, since user 102 requested to work on AWS, an AWS access token is created using AWS token converter 112. Next, the access token converter 112 will dynamically create a set of rules and policy 114 for the selected system, which is AWS in this example. In some embodiments, the cloud specific access control policy 114 is created using the cloud specific token (not shown). This access control policy takes the information from the cloud specific token and then creates a temporary role for user 102 to access the data, but within the confines of restrictions and limitations specified in the cloud specific token. In some embodiments, user 102 will then assume a specific role assigned for her in the context of her current work. In some embodiments, Jenie uses this role to use AWS services for doing her work, and she would also follow the same process for using other cloud platforms, such as Azure and GCP. According to various embodiments, by absorbing all the complexity associated with permission management, the cloud neutral access token 110 and token converters 112 make sure the development of data science can run smoothly across every third-party system involved.

Figure 2A:
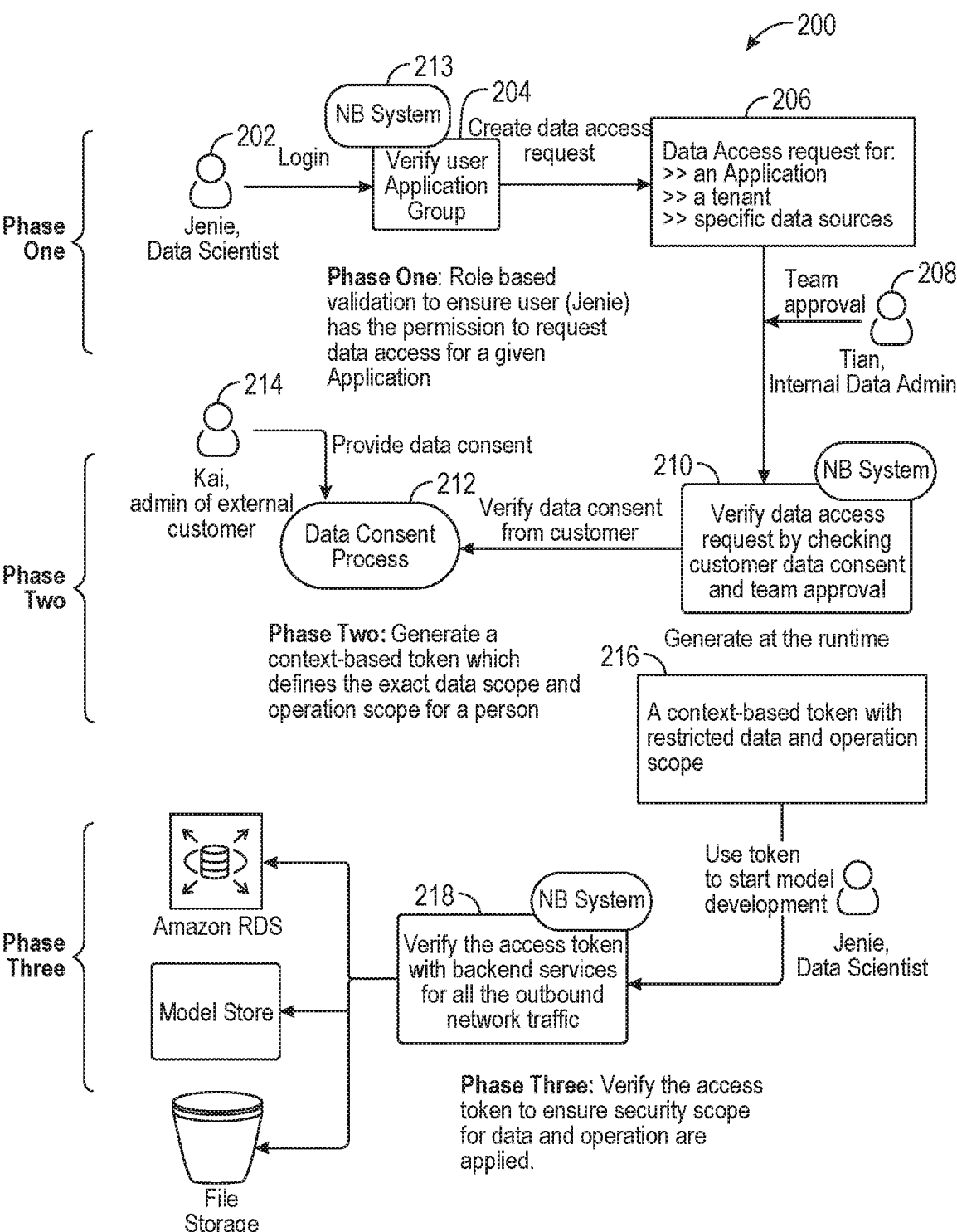
FIG. 2A is a diagram showing a detailed example workflow for the authorization process, in accordance with one or more embodiments.

FIG. 2A is a diagram showing a detailed example workflow for the authorization process, in accordance with one or more embodiments. In some embodiments, authorization process 200 begins when a user 202 requests permission from a context-based 3-phase user permission control system 204 designed to regulate human access to customer data and the artifacts derived from it. This mechanism ensures that the system's data science development adheres to its data usage requirement and can be applied to any company that treats customer data protection as a priority.

In current technology, a typical approach to managing data access in the current IT industry is either role-based or attribute-based, which means that user data access is triaged according to a user's group or security attributes. This static permission control pattern does not work well in the modern machine learning environment (especially ones with multi-tenant setups), where data access has to be granted dynamically depending on which project (machine learning features) and on which customer environment the user (data scientist) is working.

In FIG. 2A, a high level workflow for the three-phase authorization process 200 is depicted. In this way, the system can precisely control what data a data scientist can access, per client, per application, per data type, and per data table, at a very fine-grained level. In addition, this approach is flexible and time-efficient, as the user can acquire a variety of data access at run-time, as soon as the user receives approval from the team's data administrator. In some embodiments, the underlying notebook (NB) system will ensure all of the data scientist activities are restricted under the scope the user is permitted.

Normally, in traditional role-based access control (RBAC) systems, the approval/authorization process gives immediate access to the data once the user has been authorized. However, in order to institute fine granularity control over the data usage, the techniques and mechanisms of the present disclosure use a context-based approval process.

As previously mentioned, approval process 200 begins with user 202 making the request 204 to a verification system 213, e.g., a notebook (NB) system. In some embodiments, verification system 213 still uses a role based authorization process, but the role is an enhanced role. The purpose of the role validation is to determine whether user 202 belongs to a particular group that has access to the data and whether the user is working on a particular project that needs the data for a specific purpose. In some embodiments, user 202 goes to the system, logs in, and the role is checked. After user 202 is verified, the user submits a data access request 206 for what data needs to be accessed, which data store the data is in, and why the user needs it. Conventionally, normal RBAC systems give immediate access once the user is authorized. However, the techniques and mechanisms of the present disclosure provide for this step to simply authorize the user to submit a data access request 206. In other words, step one is basically the system authorizing whether user 202 is qualified to even submit the data access request 206. In some embodiments, a team manager or supervisor 208 checks to verify whether the verification is correct as a quality check.

After the user verification step, the system then proceeds to check 210 whether the owner of the data even authorized the data to be accessed for such a purpose. In some embodiments, this step is accomplished using a data consent process 212. In data consent process 212, the owner of the data or an external customer admin 214 provides data consent for a specific purpose. This is an improvement over traditional RBAC because the purpose of the data access is also controlled, which is a level granularity that is finer than traditional RBAC. Assuming the data access and the purpose of the data access is verified, then a context-based token 216 is generated. In some embodiments, the context-based token includes restricted data and operation scope.

After context-based token 216 is created, it is then converted into a cloud neutral token, which contains information regarding data scope and operation scope. The cloud neutral token is then converted into a cloud specific access token. The cloud specific access token is then verified with backend services 218 at the remote cloud system. In some embodiments, the cloud specific access token is verified to ensure security scope for data and operations are applied. The cloud specific token will list the data scope and the operation scope (from the cloud neutral token) which will be translated into access and permission boundaries.

Figure 2B:
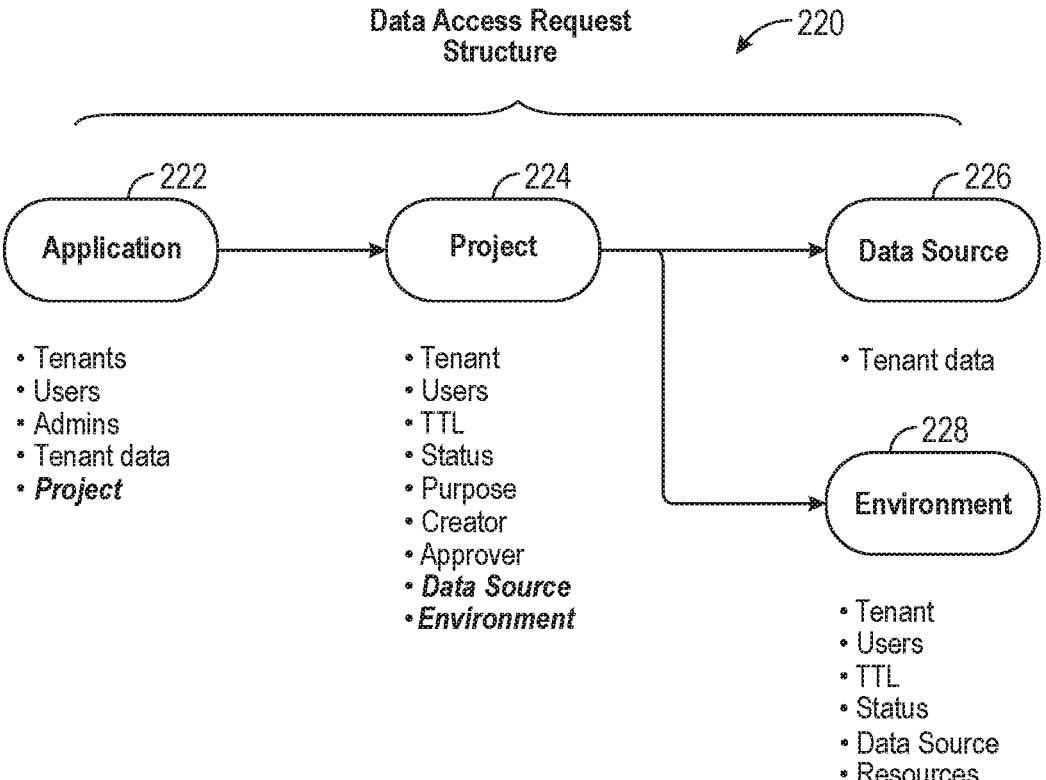
FIG. 2B is a diagram showing an example data structure, in accordance with one or more embodiments.

FIG. 2B is a diagram showing an example data structure of a data access request, such as data access request 206 in FIG. 2A, in accordance with one or more embodiments. In some embodiments, the data access request data structure 220 includes four fields: an application 222, a project 224, a data source 226, and an environment 228. In some embodiments, the Application field also includes one or more of the following parameters: tenant, user, admin, tenant data, and project. In some embodiments, the project field includes one or more of the following parameters: tenant, user, TTL, status, purpose, creator, approver, data source, and environment. In some embodiments, the data source includes the following parameter: tenant data. In some embodiments, the environment field has one or more of the following parameters: tenant, user, TTL, status, data source, and resources.

An application object 222 represents the ML learning feature the data access request is about, so the system can control the data access based which feature the data is used for. An application object has many attributes used for later permission check, such as users (who can access the ML feature), admins (who can approve the request for this ML feature), and tenants (customers who used this feature).

A project object 224 represents a data access request 220. It captures all the key information of a data request, such as tenant (the data owner), users (the person who are asking for data access permission), TTL (validate time duration of the data access), Purpose (The purpose of this request: Prototype a new ML feature, troubleshooting an existing feature or data exploration), and Data Source (data and its location).

Data Source object 226 declares the specific instance of data and its location in the data access request, such as, tenant data: customer A's monthly sales records, tenant location: customer A's data cloud storage.

Environment 228 is the actual compute instances (for example, a notebook server) the data scientist uses to access the data once the request gets approved. Its attributes contain information like TTL (time to live of the compute instance); users (the person who can access this compute instance); Status of the compute instance (Provisioning, Running, Killed) and Resources (CPU, Memory and GPU).

In some embodiments, the relationship in FIG. 2B has project 224 as the center object as it represents the data access request. In some embodiments, project 224 maps to application 222 as N:1. In some embodiments, project 224 maps to environment 228 as 1:N. In some embodiments, project 224 maps to data source 226 as 1:N. In other words, data scientists can create multiple projects 224 for one application 222 and only one application 222 per project 224. In some embodiments, each project 224 can have multiple data sources 226 and environments 228.

FIG. 2C illustrates an example data consent workflow, in accordance with embodiments. In some embodiments, the data consent process 230 includes first selecting (232) an application to consent. Next, a list of entities is selected (234). Then, the entities get added (236) to the permission set. Last, the data consent is stored (238) in a database. FIG. 2C also shows an example of a data consent table data structure 240. In addition, FIG. 2C also shows an example of a context-based token 250, written in JWT form.

In some embodiments, data consent process 230 includes the customer (the data owner) first selecting 232 which application (which is a ML feature) to grant data access to the data scientists. In some embodiments, the data access is only granted for improving this selected feature. Next, the customer selects 234 the list of entities (for example, a database table or a data file) to share data access. Then, the underlying system will encode 236 this granted permission to a permission set, which will be used later for data access authorizing. Last, the permission will be saved 238 to a database, such as data consent table 240 for tracking/ auditing purposes.

In some embodiments, data consent process 230 benefits the data owner in two ways: (1) it gives the data owner a fine control on data usage; and (2) it allows the data owner to revoke or grant data permission in a real-time manner. In traditional role based authorization systems, this is usually accomplished using an offline and manual process.

In some embodiments, data consent table 240 stores the tracking record of the consent permission. In some embodiments, ClientID 242 represents a UniqueID for the data owner. In some embodiments, Application 244 represents the ML feature this consent is granted for. In some embodiments, Entities 246 represents the list of the data (database table or files) that have been consented to for sharing.

In some embodiments, context-based token 250 is a signed JWT token, which declares the context of a data request. For example, "iss" 252 describes who issued JWT token 250. As another example, "aud" 254 defines the list of web services the token can access. In yet another example, "scp" 256 is a list of data spaces and permissions for token 250. For example, "mllake.namespace.language.READ" 258 lists token 250 as having read access to the "language" namespace in "mllake" service. In yet another example, "hw.ctx" 260 declares the token's application (ML feature).

In some embodiments, context-based token 250 represents an approved (by Internal data admin or manager) data access request from data scientists, after evaluating with the customer data consent permission. In some embodiments, the NB system will generate a cloud natural access token 110 by combining the data consent record with the context-based token 250. In this combination, the consented entities (234) are encoded in the token, along with the service and its scopes (e.g., "aud" 254, or "scp" 256).

In some embodiments, the cloud natural token represents a data request authorized by both internal data admin and external data owner. In some embodiments, the entire process is automated, and is transparent and protected by JWT encryption. In some embodiments, it is ready to be applied to actual ML systems. In some embodiments, the token is not specific to any tools or systems, which make the authorization process adaptive and easy to extend to any tools/systems.

FIG. 2D illustrates an example cloud specific token, in accordance with one or more embodiments.

Currently, data scientists can use arbitrary tools and systems to analyze data and train models. These systems can be public cloud vendors, such as AWS SageMaker and Microsoft Azure, internal homemade systems, or open source systems. When a data access request (206) is made by a data scientist, it gets approved and authorized (see FIG. 2A), this approved data access needs to be populated/applied to the actual system as set of rules, such that the data scientist's work can be authorized and restricted properly in these systems.

According to various embodiments, cloud specific token 280 is not a single JWT file, but a set of data permissions (e.g., rules and roles)—listed in the cloud neutral token (250)—which is normally written in a format that is acceptable by a specific cloud or system, such as AWS IAM roles & policies. In other words, the cloud system can utilize and respect the permissions defined in in the cloud neutral token.

FIG. 2D is an example of an AWS S3 (a cloud file storage system) policy, which declares the readonly access for a data scientist to access a file (Entity) in context of an Application. The scope (readonly), application (ML feature), user (data scientists), entities (file, s3 location) in this example all come from the cloud neutral token, but written in AWS IAM policy format.

Figure 3:
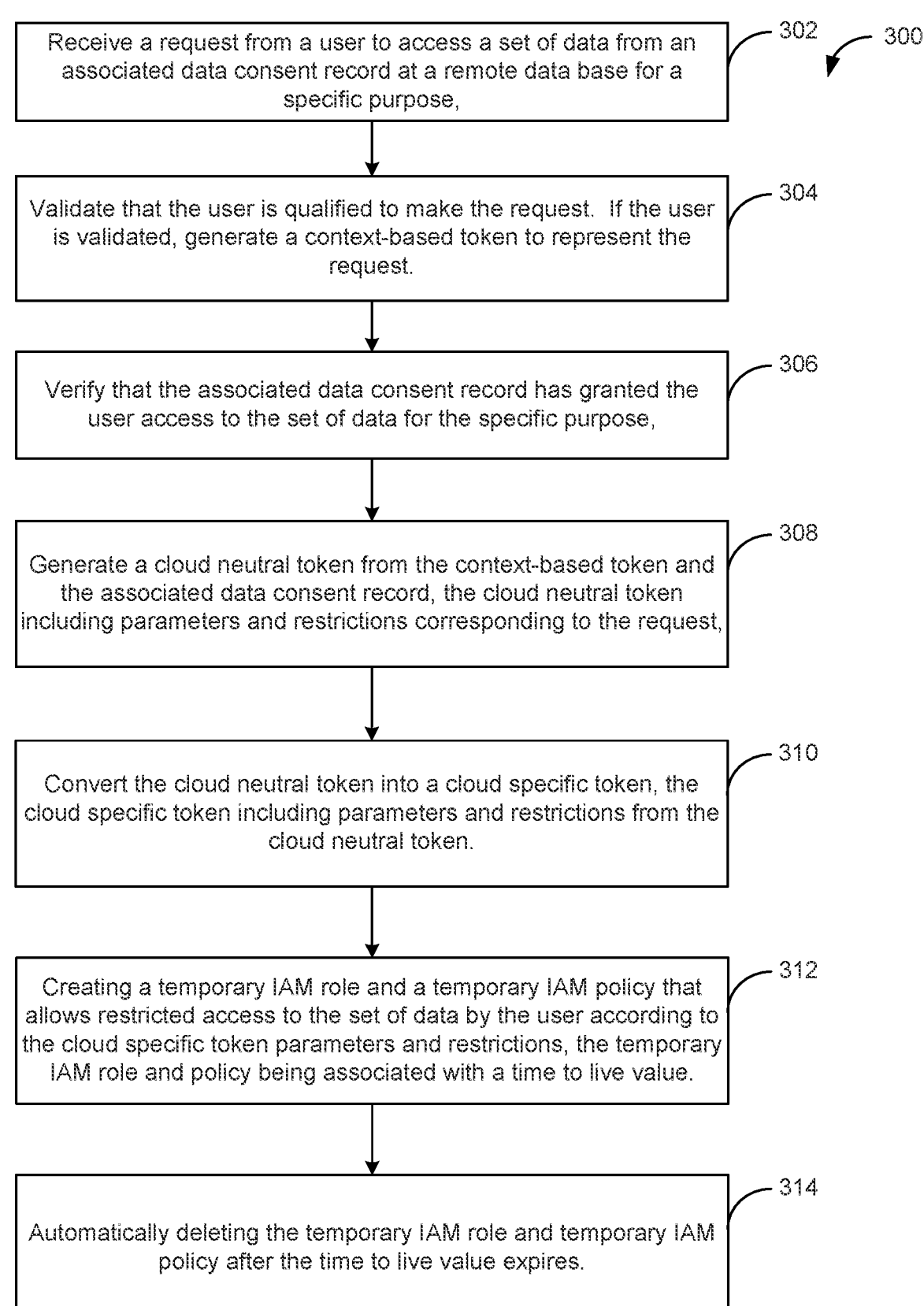
FIG. 3 illustrates an example method for fine granularity control of data access, in accordance with one or more embodiments.

FIG. 3 illustrates an example method for fine granularity control of data access, in accordance with one or more embodiments. Method 300 begins with receiving (302) a request from a user to access a set of data from an associate data consent record at a remote data base for a specific purpose. Method 300 then includes validating (304) that the user is qualified to make the request. In some embodiments, if the user is qualified to make the request, the system will generate a context-based token to represent this request. Next, the system verifies that the associated data consent record at the remote data base has granted the user access to the set of data for the specific purpose (306). Then, a cloud neutral token is generated from the context-based token and the associated data consent record (308). In some embodiments, the cloud neutral token includes parameters and restrictions corresponding to the request. Next, the cloud neutral token is converted (310) into a cloud specific token. In some embodiments, the cloud specific token includes parameters and restrictions from the cloud neutral token. Then, a temporary IAM role and a temporary IAM policy that allows restricted access to the set of data by the user according to the cloud specific token parameters and restrictions are created (312). In some embodiments, the temporary IAM role and policy are associated with a time to live value. Last, the temporary IAM role and temporary IAM policy are deleted (314) after the time to live value expires.

In some embodiments, processing of the cloud specific token involves several steps. First, the system creates an IAM role in a particular cloud platform. In some embodiments, the IAM role (a principal user management system) is specific to the cloud platform and to a specific data access request. Second, the system creates a set of IAM policies to restrict the IAM role on what cloud services (e.g., feature store, data buckets, training service) it can access, according to the operation scope defined in the cloud neutral token. Third, the system creates a set of IAM policies to restrict the IAM role on what data (e.g. data store, table, files) it can access. In some embodiments, the set of IAM policies also includes where it can save the output data. Fourth, the system attaches the IAM role to the compute resource in the specific cloud where the user is asking to use. Fifth, when the user accesses the specific cloud, the system will grant the IAM role created in first step by evaluating the cloud neutral token. Sixth, a time to live (TTL) value is submitted with the request in the first step. In some embodiments, the TTL is defined in the cloud neutral token, since the system has to tie the role to a specific purpose, the system needs to make sure that the role is short lived and not recycled for different purpose. Last, the system deletes the IAM role, and everything created for this role including resource tags, once the work is done. In some embodiments, the work is assumed done once the TTL expires. In some embodiments, the IAM role is a temporary role designed to fit within the specific window of time to accomplish the purpose for which the specific data is granted access. In alternative embodiments, instead of the user working at the remote cloud environment, the requested data is downloaded to the system. In such embodiments, the system then proceeds to create an IAM Role within the system itself. In such embodiments, a cloud neutral token may not be need since the data comes to the system and the current system's cloud platform services are already known.

In some embodiments, the fine granularity control is governed by temporary resource tags created in addition to the IAM roles. In such embodiments, the specific resources requested are tagged with the appropriate "application context" (or purpose for using the data). If the resource tag and the tags in the IAM role do not match up, then the access is denied.

Figure 4:
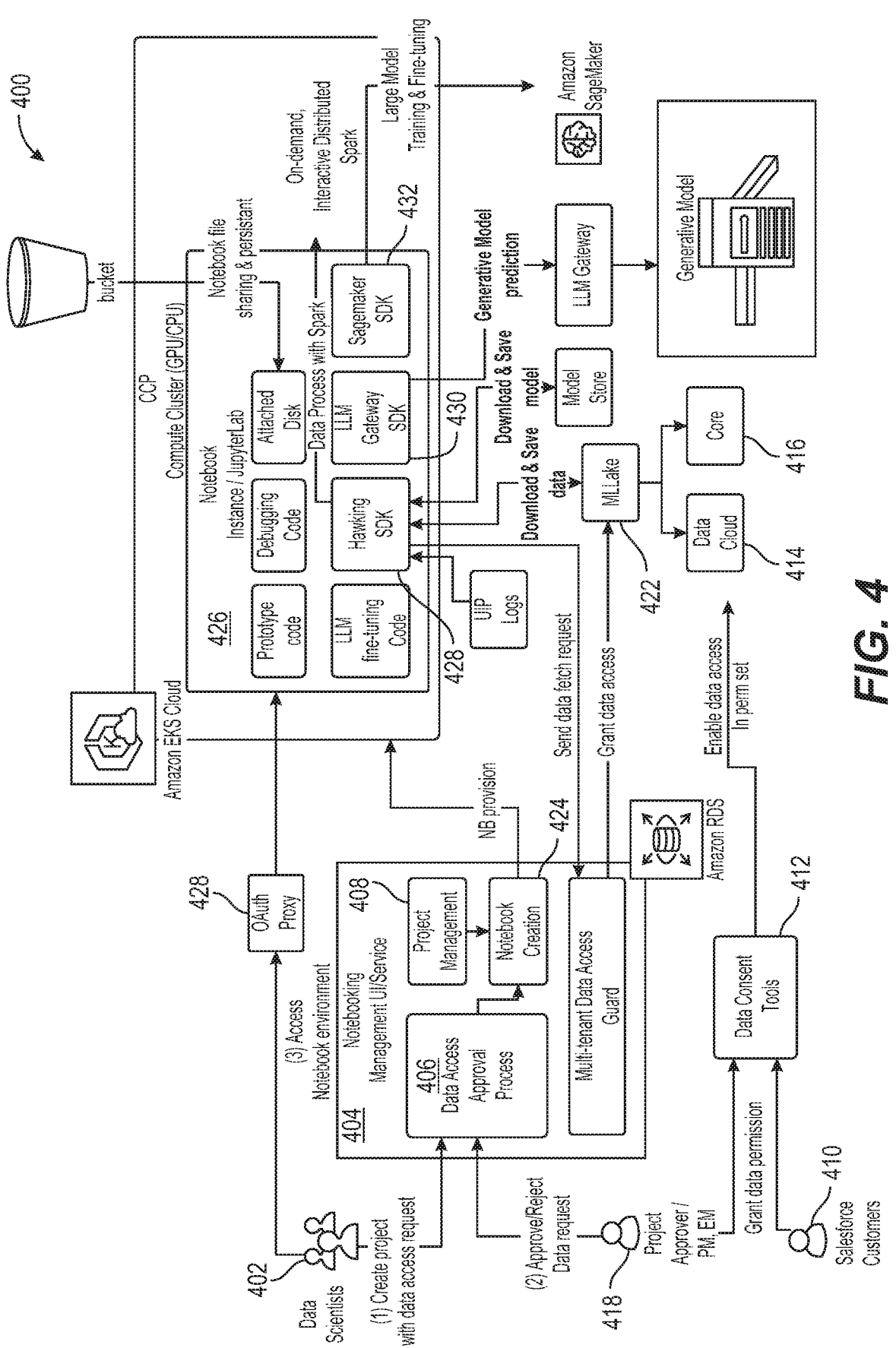
FIG. 4 illustrates a detailed example architecture for fine granularity data access control, in accordance with one or more embodiments.

FIG. 4 illustrates a detailed example architecture for fine granularity data access control, in accordance with one or more embodiments. In some embodiments, a data scientist 402 submits a data access request for a specific purpose (for example, improving a ML feature) by creating a notebook project via a "Data Access Approval Process" 406 and "Project Management" 408 in a "Notebooking Management Service" 404. In some embodiments, the request includes what data, which customer (e.g., data owner), and usage scope (e.g., specific usage purpose).

In some embodiments, as an independent process (e.g., happening remotely and/or asynchronously), data owner 410 (e.g., a Salesforce customer) grants their permission (data consent) for data scientists 402 to access the requested set of their data with certain usage scope. The data consent record will be saved in a database, such as data consent tool 412. In some embodiments, data access will be enabled in a perm set, and the perm set will be updated to a remote data storage, such as data cloud 414 (e.g., Salesforce DataCloud) and/or core database 416 (e.g., Core Database).

In some embodiments, a product manager or engineering manager 418 of an application (e.g., ML feature) will review the access request (e.g., notebook project) from data scientists 402, and approve it if the access request is appropriate.

As a result, a context-based access token will be created by a component of "Data Access Approval Process" 406 to represent the requested data access scope.

In some embodiments, "Data Access Approval Process" 406 will validate the data scope in the context-based token with the data consent record in "data consent tool" 412. In some embodiments, "Data Access Approval Process" 406 will create a cloud neutral token if data owner 410 has granted the consent for the requested data scope.

In some embodiments, data scientist 402 then requests the system to create a notebook environment (e.g., provision a webserver) under the approved project (data access request) by using "Notebook Creation" 424. In some embodiments, "Notebook Creation" component 424 will provision the compute resources (e.g., CPU, memory and GPU) for this environment. In some embodiments, "Notebook Creation" 424 will also associate the cloud neutral token to this environment to declare/restrict its data access scope.

In some embodiments, "Notebook Creation" 424 will also convert the cloud neutral token to a cloud specific token, including the roles and policies, and apply them to the actual remote systems such as DataCloud 414, Core Database 416, AWS SageMaker 420, and/or MLLake 422.

In some embodiments, after environment provision completes, data scientists 402 can then login to the actual notebook environment 426 via an OAuth Proxy 428, which does the authentication and authorization for data scientist 402.

In some embodiments, inside the notebook environment 426, data scientists 402 start to develop the ML code and use the SDKs (e.g., hawking SDK 428, LLM Gateway SDK 430, and/or SageMaker SDK 432) to interact with remote resources. In some embodiments, these interactions can include accessing data and kicking off model training jobs in remote sources, such as AWS SageMaker 420. In some embodiments, since all the cloud specific permission/roles/policies are set automatically at the environment provision time, data scientist 402 has no place to update or change the associated permissions. Thus, the data access for the approved user is secured and also restricted within environment 426.

In some embodiments, the key is to front load the approval process so that the permissions are already attached to the tool (cloud service) before the user comes and uses the tool, which is represented as the pink box.

Figure 5:
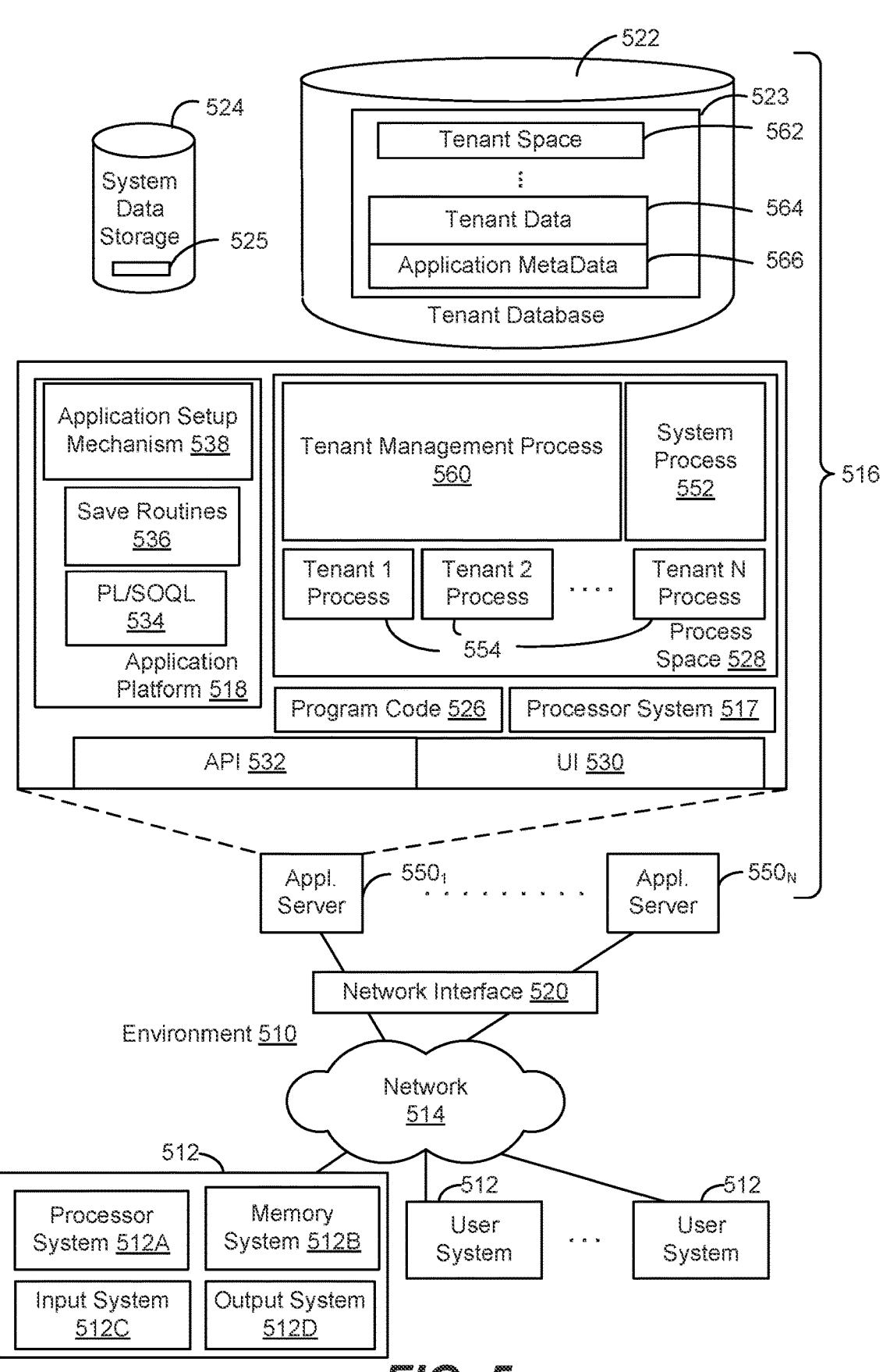
FIG. 5 shows a block diagram of an example of a database environment, configured in accordance with one or more embodiments.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based processing engine system. For example, in some implementations, system 516 may include application servers configured to implement and execute processing engine software applications. The application servers may be configured to provide related data, code, forms, web pages and other information to and from user systems 512. Additionally, the application servers may be configured to store information to, and retrieve information from, a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a processing engine, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale process, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 6A, 6B:
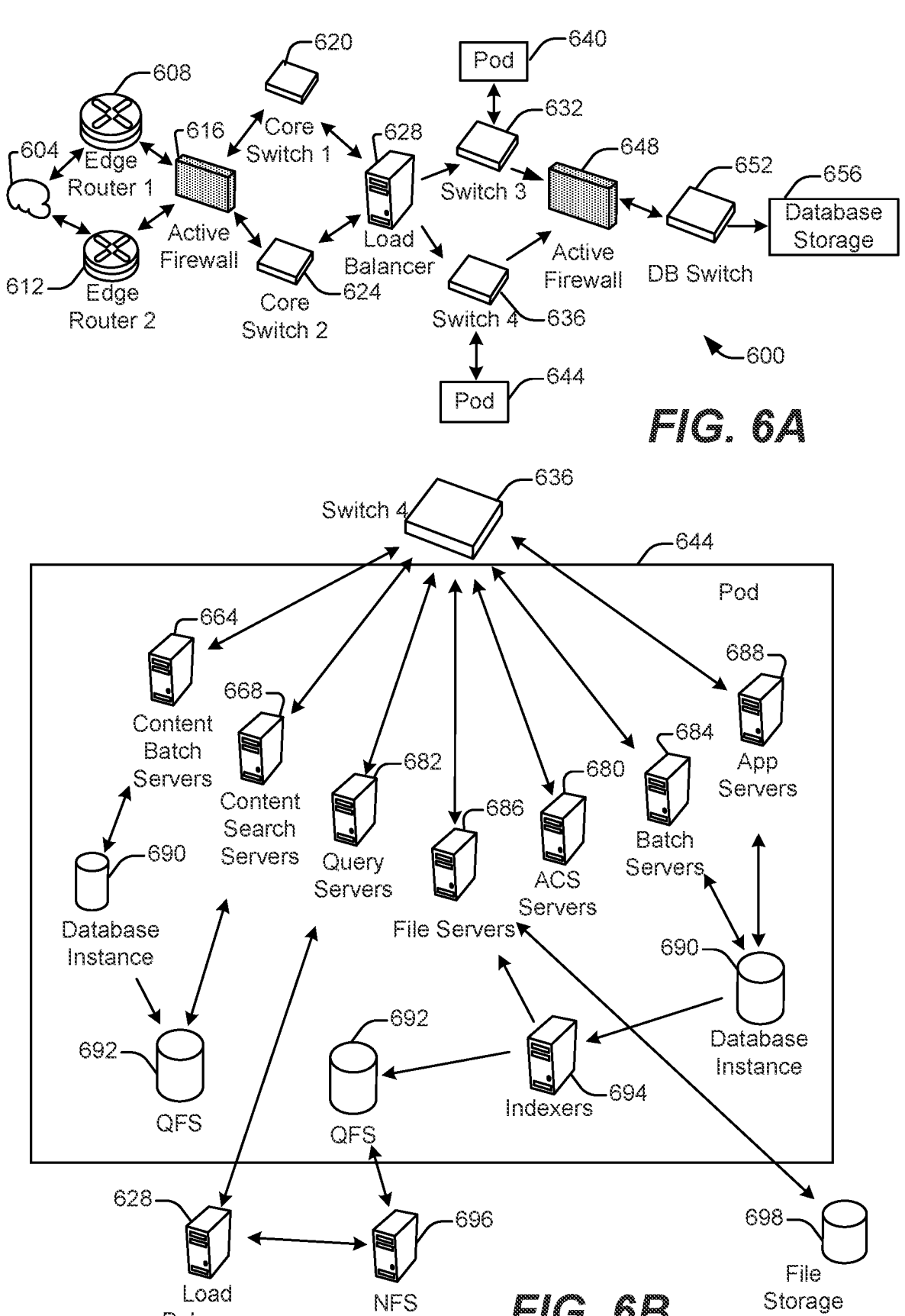
FIG. 6A shows a system diagram of an example of architectural components of an on-demand database service environment, in accordance with embodiments.
FIG. 6B shows a system diagram further illustrating an example of architectural components of an on-demand database service environment, in accordance with one or more embodiments.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include any-where from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process processing engine information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
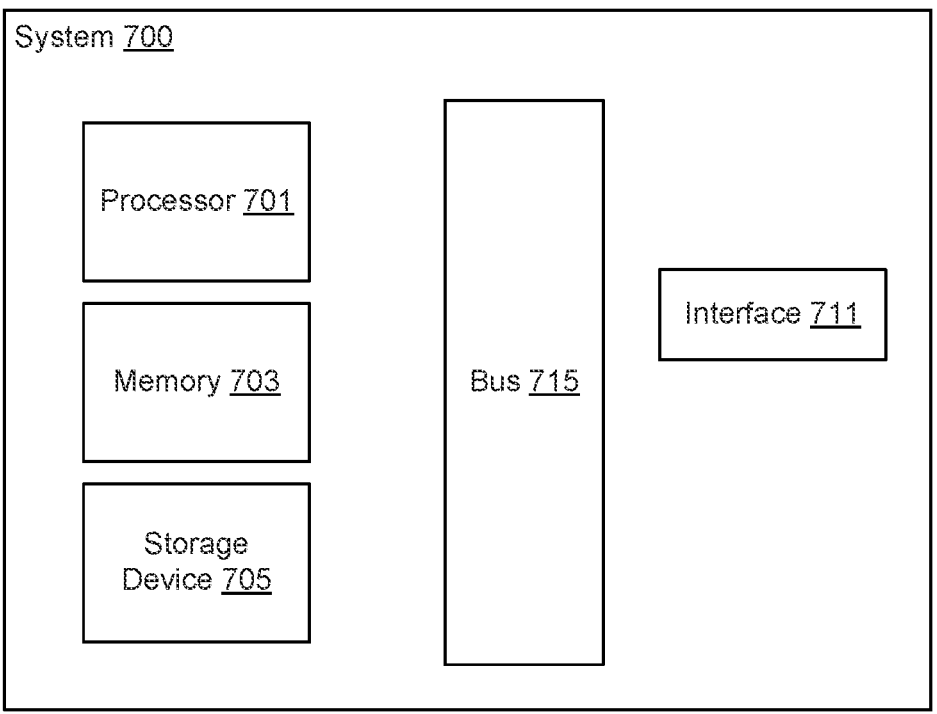
FIG. 7 illustrates one example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A system comprising:

a processor;

memory, the memory storing instructions for executing a method, the method comprising;

receiving a request from a user to access a set of data from an associated data consent record at a remote database for a specific purpose;

generating a cloud neutral token based on the request and the associated data consent record, wherein the cloud neutral token includes parameters and restrictions corresponding to the request and the cloud neutral token comprises a platform-agnostic data structure that encapsulates request parameters and consent-based restrictions in a universal format interpretable across multiple cloud platforms;

converting the cloud neutral token into multiple cloud specific tokens, the multiple cloud specific tokens including parameters and restrictions from the cloud neutral token, wherein each cloud specific token is generated specifically for a different remote cloud system, wherein each cloud specific token comprises a platform-specific data structure transformed from the cloud neutral token, the transformation comprising converting the universal format into a native format associated with each respective remote cloud system;

at each remote cloud system, creating a temporary Identity and Access Management (IAM) role and a temporary IAM policy that allows restricted access to the set of data by the user according to corresponding cloud specific token parameters and restrictions, the temporary IAM role and the temporary IAM policy being associated with a time to live value; and automatically deleting the temporary IAM role and temporary IAM policy after the time to live value expires.

2. The system of claim 1, wherein the remote database grants access via a data consent process.

3. The system of claim 1, wherein the user is validated as being part of a team and project that has been granted access from the remote database for the specific purpose.

4. The system of claim 3, wherein validating the user does not immediately grant access to the set of data.

5. The system of claim 1, wherein the user can only access the data for the specific purpose and not any other purpose.

6. The system of claim 1, wherein, at each remote cloud system, the specific purpose is enforced via tagging resources with tags corresponding to an application context field specified in each corresponding cloud specific token.

7. The system of claim 6, wherein after the time to live value expires the tags are also deleted.

8. The system of claim 1, wherein the cloud neutral token is generated by combining a context-based token representing the request with the associated data consent record.

9. The system of claim 1, wherein the temporary IAM role is created for a single data access request and is not reusable for a different request.

10. The system of claim 1, wherein the parameters and restrictions in the cloud specific tokens include both a data scope defining specific data entities and an operation scope defining permitted actions on the specific data entities.

11. The system of claim 1, wherein the cloud neutral token maintains a standardized schema independent of any specific cloud platform implementation and each cloud specific token conforms to schema requirements of respective remote cloud systems.

12. The system of claim 1, wherein the cloud-neutral token operates as a platform-agnostic policy definition, and wherein converting the cloud-neutral token into the multiple cloud-specific tokens comprises translating the single platform-agnostic policy definition into a plurality of platform-enforceable policies.

13. A method comprising:

receiving a request from a user to access a set of data from an associated data consent record at a remote database for a specific purpose;

generating a cloud neutral token based on the request and the associated data consent record, wherein the cloud neutral token includes parameters and restrictions corresponding to the request and the cloud neutral token comprises a platform-agnostic data structure that encapsulates request parameters and consent-based restrictions in a universal format interpretable across multiple cloud platforms;

converting the cloud neutral token into multiple cloud specific tokens, the multiple cloud specific tokens including parameters and restrictions from the cloud neutral token, wherein each cloud specific token is generated specifically for a different remote cloud system, wherein each cloud specific token comprises a platform-specific data structure transformed from the cloud neutral token, the transformation comprising converting the universal format into a native format associated with each respective remote cloud system;

at each remote cloud system, creating a temporary Identity and Access Management (IAM) role and a temporary IAM policy that allows restricted access to the set of data by the user according to corresponding cloud specific token parameters and restrictions, the temporary IAM role and the temporary IAM policy being associated with a time to live value; and automatically deleting the temporary IAM role and temporary IAM policy after the time to live value expires.

14. The method of claim 13, wherein the remote database grants access via a data consent process.

15. The method of claim 13, wherein the user is validated as being part of a team and project that has been granted access from the remote database for the specific purpose.

16. The method of claim 15, wherein validating the user does not immediately grant access to the set of data.

17. The method of claim 13, wherein the user can only access the data for the specific purpose and not any other purpose.

18. The method of claim 13, wherein, at each remote cloud system, the specific purpose is enforced via tagging resources with tags corresponding to an application context field specified in each corresponding cloud specific token.

19. The method of claim 18, wherein after the time to live value expires the tags are also deleted.

20. A non-transitory computer readable medium storing instructions to cause a processor to execute a method, the method comprising:

receiving a request from a user to access a set of data from an associated data consent record at a remote database for a specific purpose;

generating a cloud neutral token based on the request and the associated data consent record, wherein the cloud neutral token includes parameters and restrictions corresponding to the request and the cloud neutral token comprises a platform-agnostic data structure that encapsulates request parameters and consent-based restrictions in a universal format interpretable across multiple cloud platforms;

converting the cloud neutral token into multiple cloud specific tokens, the multiple cloud specific tokens including parameters and restrictions from the cloud neutral token, wherein each cloud specific token is generated specifically for a different remote cloud system, wherein each cloud specific token comprises a platform-specific data structure transformed from the cloud neutral token, the transformation comprising converting the universal format into a native format associated with each respective remote cloud system;

at each remote cloud system, creating a temporary Identity and Access Management (IAM) role and a temporary IAM policy that allows restricted access to the set of data by the user according to corresponding cloud specific token parameters and restrictions, the temporary IAM role and the temporary IAM policy being associated with a time to live value; and automatically deleting the temporary IAM role and temporary IAM policy after the time to live value expires.

* * * * *